UNITED STATES PATENT OFFICE

OSCAR KNAB, OF NEWARK, NEW JERSEY.

IMPROVEMENT IN PROCESSES OF COLORING TOBACCO.

Specification forming part of Letters Patent No. 159,102, dated January 26, 1875; application filed December 12, 1874.

*To all whom it may concern:*

Be it known that I, OSCAR KNAB, of Newark, in the county of Essex and State of New Jersey, have invented a new and Improved Process for Treating Tobacco-Leaves, of which the following is a specification:

The object of my invention is to treat the bunches of tobacco-leaves used for wrappers in such a manner that the darker color of the tobacco-leaves, which, in most cases, has been bleached by exposure to the air and sun in the drying of the same for market, is revivified or resuscitated in a simple, cheap, and efficacious manner. The invention consists in passing the moistened and softened leaves in whole bunches through a solution of sesquichloride of iron in water in suitable proportions, and work it off in the moist state for wrappers in the usual manner.

The sesquichloride of iron (*liquor ferri sesquichlorati*) is obtained in liquid state and dissolved in water by adding about ten grams of the same to one liter of water. The bunches of tobacco-leaves, especially those of lighter yellowish and bleached color are passed through this solution and soaked therein after having been moistened and softened for twenty-four hours, so that the solution is more ready to act on all the parts of the leaves.

The chemical compounds of nicotine and tannin, which are contained in a greater or lesser proportion in all tobaccos, enter, by their affinity with the sesquichloride of iron, in combination therewith, and impart thereby a dark permanent color to the leaves without the least taste, smell, or other deleterious influence thereon; producing, on the contrary, a more pliable leaf and a better burning of the same when worked up. The bunches are then hung up till the surplus solution has dripped off, and are, when in sufficient moist state, wrapped up into bundles and be marked off for wrapppers and into cigars in the usual manner.

The assorting of the cigars is greatly simplified, as, by the uniformity of color imparted to the leaves, a considerably-reduced number of classes is obtained. The cost of the solution is small in comparison to the greater number of additional leaves made available for wrappers, which leaves had to be used heretofore to a greater or lesser extent for fillers.

Having thus described my invention, I claim as new and desire to secure by Letters Patent—

The process herein described of treating tobacco-leaves for imparting or restoring a dark color of the same, consisting in passing the leaves, in a soft and moistened state, through a solution of sesquichloride of iron, substantially as herein set forth.

OSCAR KNAB.

Witnesses:
PAUL GOEPEL,
THEODORE GORLACH.